(12) United States Patent
Thummar et al.

(10) Patent No.: US 11,313,292 B1
(45) Date of Patent: Apr. 26, 2022

(54) METHODS AND SYSTEMS FOR REAL-TIME DOSING OF ADDITIVES INTO A FUEL SUPPLY UNIT

(71) Applicant: REAL TIME AUTOMATED TECHNOLOGIES LLC, Caddo, OK (US)

(72) Inventors: Pareshkumar Thummar, Bangalore (IN); Ashish Kumar, Bangalore (IN); Alan Dale Dufur, Caddo, OK (US)

(73) Assignee: REAL TIME AUTOMATED TECHNOLOGIES LLC, Caddo, OK (US)

( * ) Notice: Subject to any disclaimer, the term of this patent is extended or adjusted under 35 U.S.C. 154(b) by 0 days.

(21) Appl. No.: 17/212,433

(22) Filed: Mar. 25, 2021

(51) Int. Cl.
| | |
|---|---|
| *F02D 41/00* | (2006.01) |
| *F02D 19/12* | (2006.01) |
| *F02D 41/24* | (2006.01) |
| *F02D 41/14* | (2006.01) |

(52) U.S. Cl.
CPC ......... *F02D 41/0025* (2013.01); *F02D 19/12* (2013.01); *F02D 41/1405* (2013.01); *F02D 41/2477* (2013.01); *F02D 41/2487* (2013.01); *F02D 2200/0611* (2013.01)

(58) Field of Classification Search
CPC ............ F02D 41/0025; F02D 41/1405; F02D 41/2477; F02D 19/12; F02D 41/2487; F02D 2200/0611
See application file for complete search history.

(56) References Cited

U.S. PATENT DOCUMENTS

| | | | | |
|---|---|---|---|---|
| 4,557,221 A * | 12/1985 | Kamel | ..................... | F02D 19/12 123/1 A |
| 4,568,248 A * | 2/1986 | Harders | .............. | F02D 41/0025 417/43 |
| 4,727,827 A * | 3/1988 | Hoffman | ................. | F02D 19/12 123/1 A |
| 5,331,994 A * | 7/1994 | Bryan, III | ............... | F02B 51/00 137/1 |
| 5,441,072 A * | 8/1995 | Indey | ..................... | F02D 19/12 137/101.21 |
| 6,068,672 A * | 5/2000 | Watson | ................... | F02D 19/12 44/629 |
| 6,276,310 B1 * | 8/2001 | Backes | .................. | F02D 19/12 123/1 A |
| 7,134,405 B2 * | 11/2006 | Vincent | ..................... | C10L 1/30 123/1 A |
| 7,207,318 B2 * | 4/2007 | Lepperhoff | .............. | F01M 1/22 123/438 |
| 8,061,383 B2 * | 11/2011 | Gouzou | .............. | F02D 41/0025 137/572 |
| 9,422,874 B2 * | 8/2016 | Lukaczyk | ............... | F02B 47/02 |
| 9,458,761 B2 * | 10/2016 | Guinther | ................. | C10L 1/223 |

(Continued)

*Primary Examiner* — Joseph J Dallo
(74) *Attorney, Agent, or Firm* — Maschoff Brennan

(57) ABSTRACT

Methods and systems for real-time dosing of additives into a fuel supply unit. A method disclosed herein includes capturing at least one real-time operating condition of the equipment. The method further includes determining dosage of the at least one additive to be dosed into the fuel supply unit of the equipment, based on the captured at least one operating condition of the equipment. The method further includes enabling an additive dispensing device to dose the determined dosage of the at least one additive into the fuel supply unit of the equipment.

33 Claims, 16 Drawing Sheets

(56) References Cited

U.S. PATENT DOCUMENTS

| | | | | |
|---|---|---|---|---|
| 9,677,969 B2* | 6/2017 | Harle | ...................... | F02D 19/12 |
| 9,938,943 B2* | 4/2018 | Harle | .................. | F02D 41/0025 |
| 2004/0231615 A1* | 11/2004 | Vincent | ................. | C10L 1/1208 |
| | | | | 123/1 A |

* cited by examiner

| Equipment Type | States | | | Actions | | | Feedbacks | | |
|---|---|---|---|---|---|---|---|---|---|
| | Load | Temperature | ...Nth state | Dosage | Fuel Consumption | ...Nth Action | Efficiency | Emissions | ...Nth Feedback |
| | | | | | | | | | |
| | | | | | | | | | |

FIG. 7b

METHODS AND SYSTEMS FOR REAL-TIME DOSING OF ADDITIVES INTO A FUEL SUPPLY UNIT

TECHNICAL FIELD

The embodiments herein relate to fuel supply units and more particularly, to real time dosing of additives into a fuel supply unit of an equipment.

BACKGROUND

In general, efficiency and performance of engines/equipment, such as, but are not limited to, stationary engines, mobility engines, turbine engines, aeroengines, or the like, may be optimized for conserving fuel and reducing emission.

In an example conventional approach, an injection system may be used to optimize the efficiency and performance of the equipment. The injection system optimizes the efficiency and performance of the equipment by dosing one or more additives in a fuel at a fuel supply unit of the equipment. In another example convention approach, solutions such as, but are not limited to, Artificial Intelligence (AI), Machine Learning (ML), and so on, may be used to optimize the efficiency and performance of the equipment by dosing the one or more additives in the fuel. The neural network based solutions may also be used for maintenance of the equipment for malfunctions or fault diagnosis.

Further, in the above described conventional approaches,
- the additives have to be added in the fuel with specified dosage levels or percentage. The dosage levels of the additives may not be always same in a combustion chamber or where the fuel burns. However, in the conventional approaches, the dosage levels may be pre-defined or fixed for the particular additive, irrespective of a type of the equipment, and associated operating conditions such as, load, torque, Rotation Per Minute (RPM) of the equipment, volume, time, temperature, or the like. Thus, adding incorrect proposition of the additives in the fuel may increase cost and non-optimal use of the additives;
- the additives have to be added in the fuel, at a source of the fuel supply unit (i.e., in fuel tanks), as many of the additives are in forming forms. However, adding the additives in the fuel at the source may create problems of rusting fuel tanks/source, damaging gaskets and other fittings of the equipment, or the like. Further, adding the additives in the fuel at the source may sometimes adversely affect results of operations of the equipment;
- the additives have to be properly homogenized with the fuel during whole usage cycle, otherwise the additives may settle at the source of the fuel supply unit; and
- there may be a limitation to usage limit of adding the additives in the fuel when a desired dosage of fuel composition of a particular standard is more than the usage limit of additives at a refinery level or at fuel bunks.

Thus, the conventional approaches may use mechanical (i.e., the usage of the injection system) or electronical methods for optimization of the equipment. However, such methods alone may optimize fuel efficiency of the equipment, but not always result in a reduction in the emissions.

BRIEF DESCRIPTION OF THE FIGURES

The embodiments disclosed herein will be better understood from the following detailed description with reference to the drawings, in which:

FIG. 7b is an example table depicting a training dataset used to train the mapping function module, according to embodiments as disclosed herein;

DETAILED DESCRIPTION OF EMBODIMENTS

Figure 1A:
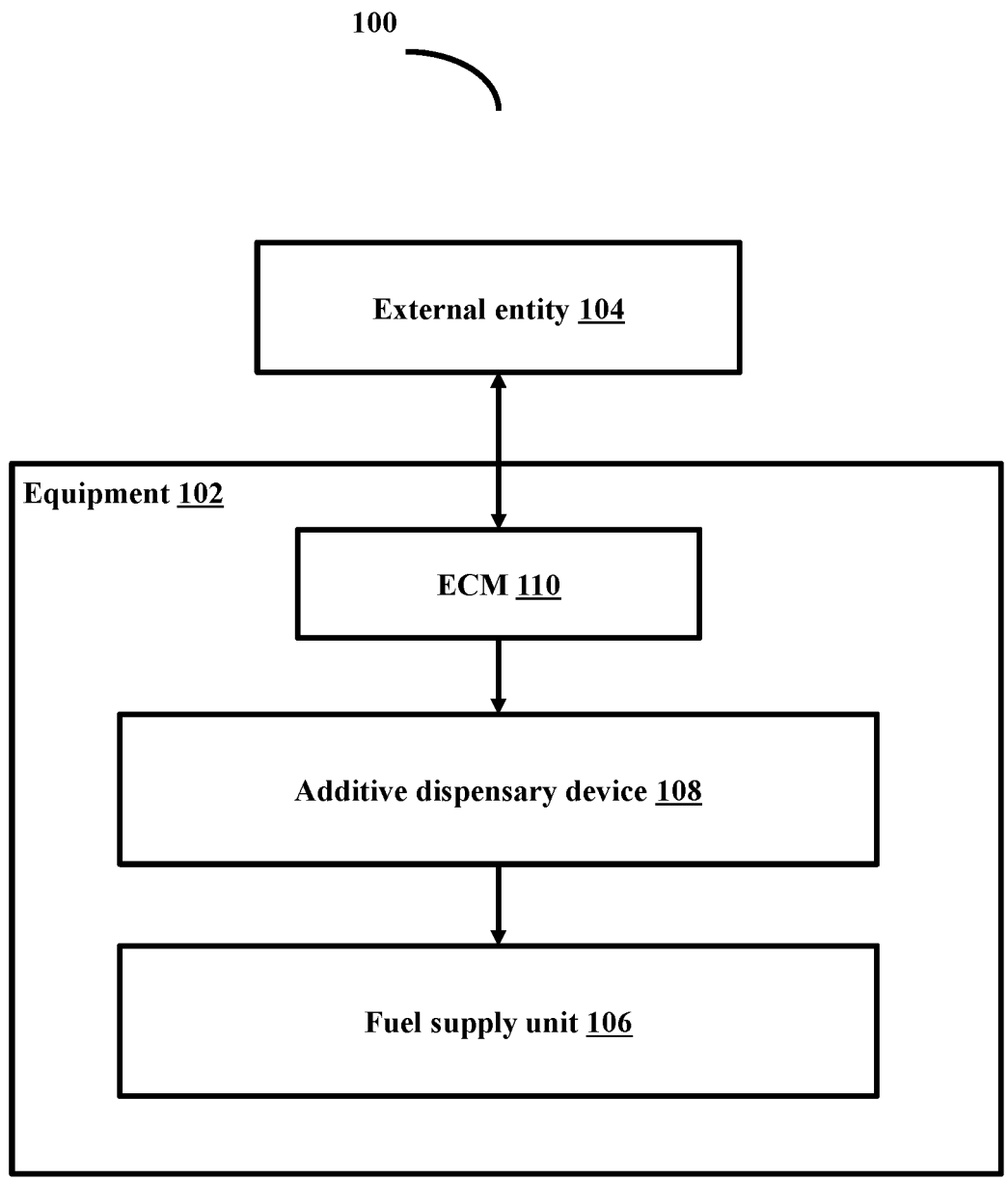
FIGS. 1a, 1b, 1c and 1d depict a dosing system for real-time dosing of one or more additives into a fuel supply unit of an equipment, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for real time dosing of one or more additives into a fuel supply unit of an equipment for reducing emission and increasing fuel efficiency, which in turn optimizes performance of the equipment.

Embodiments herein disclose methods and systems for determining the one or more additives, and quantity/amount of the one or more additives to be dosed into the fuel supply unit of the equipment, based on real-time operating conditions of the equipment.

Embodiments herein disclose an additive dispensing device to dose the determined one or more additives into the fuel supply unit of the equipment, at the determined time of dosing.

Embodiments herein define at least one site to dose the one or more additives into the fuel supply unit of the equipment, wherein the at least one site is any component of the fuel supply unit, wherein at least one fuel does not burn.

Referring now to the drawings, and more particularly to FIGS. 1a through 12, where similar reference characters denote corresponding features consistently throughout the figures, there are shown embodiments.

Embodiments herein use the terms "fuel supply unit", "fuel supply system", "fuel injection unit", and so on, interchangeably to refer to a unit that supplies one or more fuels to a combustion chamber or a burning site.

Embodiments herein use the terms "additive dispensing device", "additive dispensing system", "additive dosing system", "additive dosing pump and device", "dosing control device", and so on, interchangeably to refer to a device that may be used to dose one or more additives into the fuel supply unit.

Embodiments herein use the terms "electronic control module (ECM)", "electronic control unit (ECU)", "control device", "controller", "control unit", and so on interchangeably, to refer to a unit/module that manages the real-time dosing of the one or more additives into the fuel supply unit.

FIGS. 1a, 1b, 1c and 1d depict a dosing system 100 for real-time dosing of one or more additives into a fuel supply unit of an equipment, according to embodiments as disclosed herein. The dosing system 100 includes an equipment 102, and an external entity 104.

The equipment 102 referred herein may be configured to derive energy from combustion of one or more fuels. In an example, the equipment 102 may be an engine of a vehicle. Examples of the vehicle may be, but are not limited to, cars, motor vehicles, two wheeled vehicles, three wheeled vehicles, work machines, aero vehicles, farm implements, and so on. It is understood that the equipment 102 may not be limited to any vehicle, and the equipment 102 may be associated with any other means that operate on the one or more fuels.

Examples of the equipment 102 may be, but are not limited to, stationary engines, mobility engines, fuel-oil fired furnaces and boilers, fuel-fired gas turbines power generators, turbo engines, aero engines, marine engines, or any other automobile engine that operates on the one or more fuels. Examples of the one or more fuels may be, but are not limited to, petroleum, diesel, bio-fuel, gaseous fuel, bio-diesel, gas oil, and so on. In an example, the equipment 102 may be an engine that operates on a single fuel. In another example, the equipment 102 may be a dual fuel engine that operates on two different fuels (a primary fuel and a secondary fuel).

The equipment 102 includes a fuel supply unit/system 106, an additive dispensing device 108, and an Electronic Control Module (ECM) 110.

Figure 5:
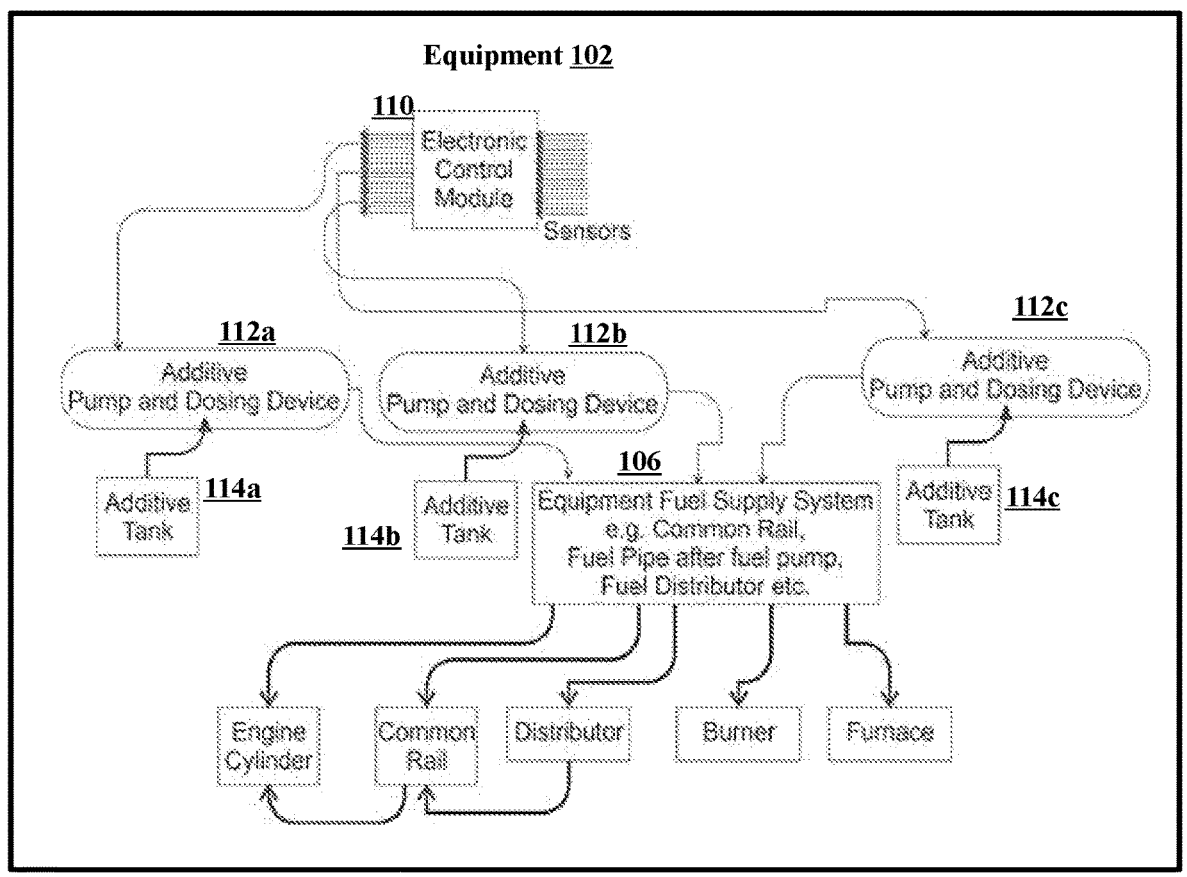
FIG. 5 depicts an example equipment, wherein the one or more additives may be dosed into the fuel supply unit based on real-time operating conditions of the equipment, according to embodiments as disclosed herein.
Figure 6:
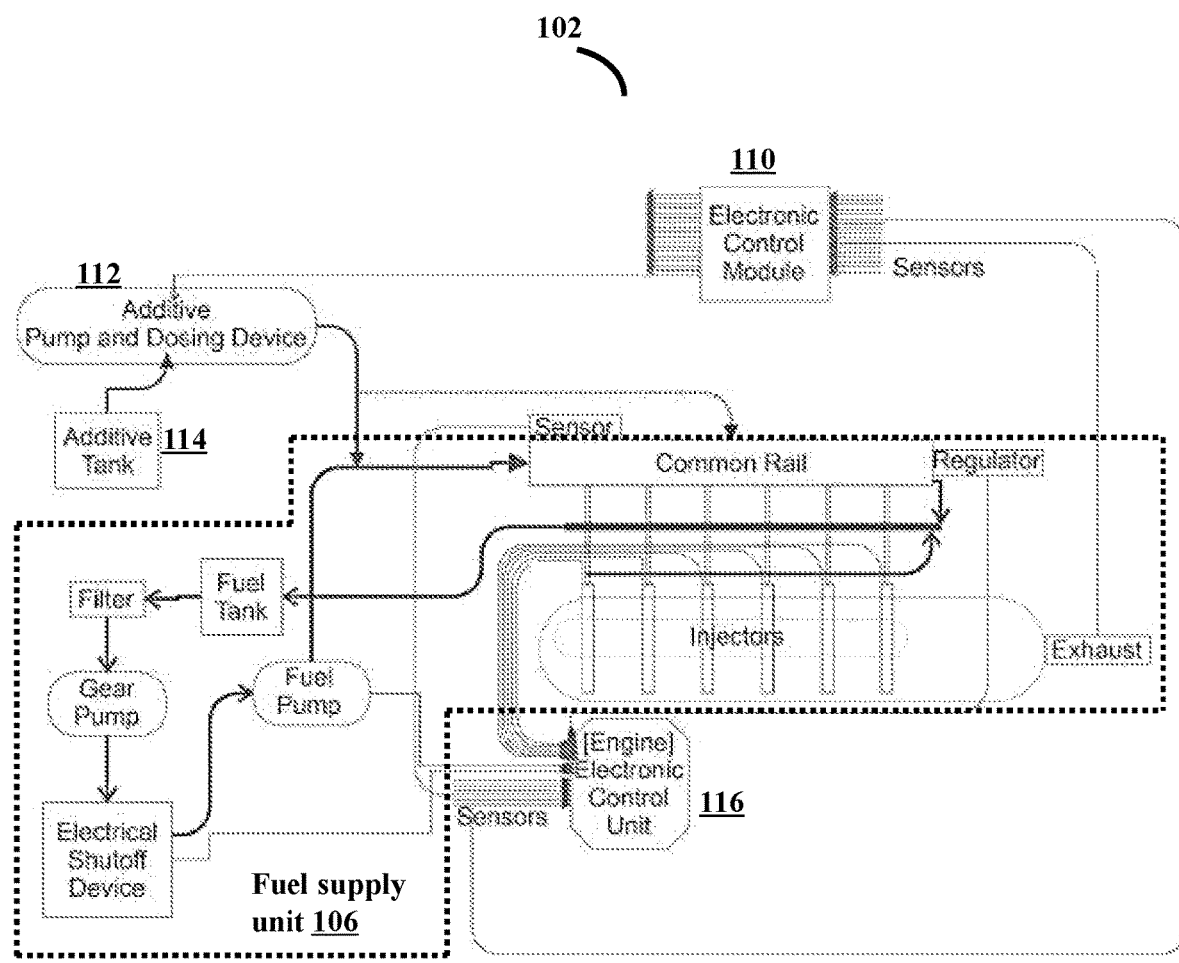
FIG. 6 depicts an example equipment, wherein the equipment is a common rail direct injection engine, wherein the one or more additives may be dosed into the fuel supply unit based on the real-time operating conditions of the equipment, according to embodiments as disclosed herein.

The fuel supply unit 106 may be configured to store and supply fuel to a combustion chamber (a burner, a cylinder chamber, or the like), where the fuel may be mixed with air, vaporized, and burned to produce energy. The fuel supply unit 106 may include various components, depending on a type of the equipment 102. In an example, as depicted in FIG. 5, the fuel supply unit 106 includes a common rail, a fuel pump, a fuel pipe, a fuel distributor, an engine cylinder, a burner, a furnace, and so on. In another example, as depicted in FIG. 6, if the equipment 102 is a common rail direct injection engine, the fuel supply unit 106 includes a common rail, a regulator, one or more fuel injectors, a fuel tank, a fuel pump, a filter, a gear pump, an electrical shut-off device, and so on. It is understood that the fuel supply unit 106 includes various other components (including those described above), based on the type of the equipment 102. A function of the fuel supply unit 106 may be intuitively inferred by one of ordinary skill in the art based on its name or type, and thus, its detailed description is omitted.

The additive dispensing device 108 may be configured to dose/add one or more additives into the fuel supply unit 106. In an embodiment herein, dosing the one or more additives into the fuel supply unit 106 refers to dosing/adding the one or more additives to the one or more fuels, at various stages before burning the one or more fuels in the fuel supply unit 106. The one or more additives may include one or more individual chemical substances or a combination of a plurality of chemical substances having individual or a combined synergistic effect, when dosed with the one or more fuels. Examples of the one or more additives may be, but are not limited to, fuel combustion catalyst, heat transfer catalyst, fuel born catalyst, cleaner, friction modifier, friction reducer, fuel saver, fuel chemistry alteration, detergency, acid neutralizer, start improver, lube enhancer, antioxidants, peroxide reducer, anti-settling agents, scavenger, corrosion inhibitors, and so on. In an example, the one or more additives may be in physical forms, such as, but are not limited to, a liquid, a gel, a solid, and so on. Adding the one or more additives into the fuel supply unit 106 improves at least one of, distribution of the one or more fuels in the equipment 102, operation of the equipment 102, stability of operation of the equipment 102, and so on. Thereby increasing performance and efficiency of the equipment 102 by conserving the fuel and reducing emission.

Figure 1B:
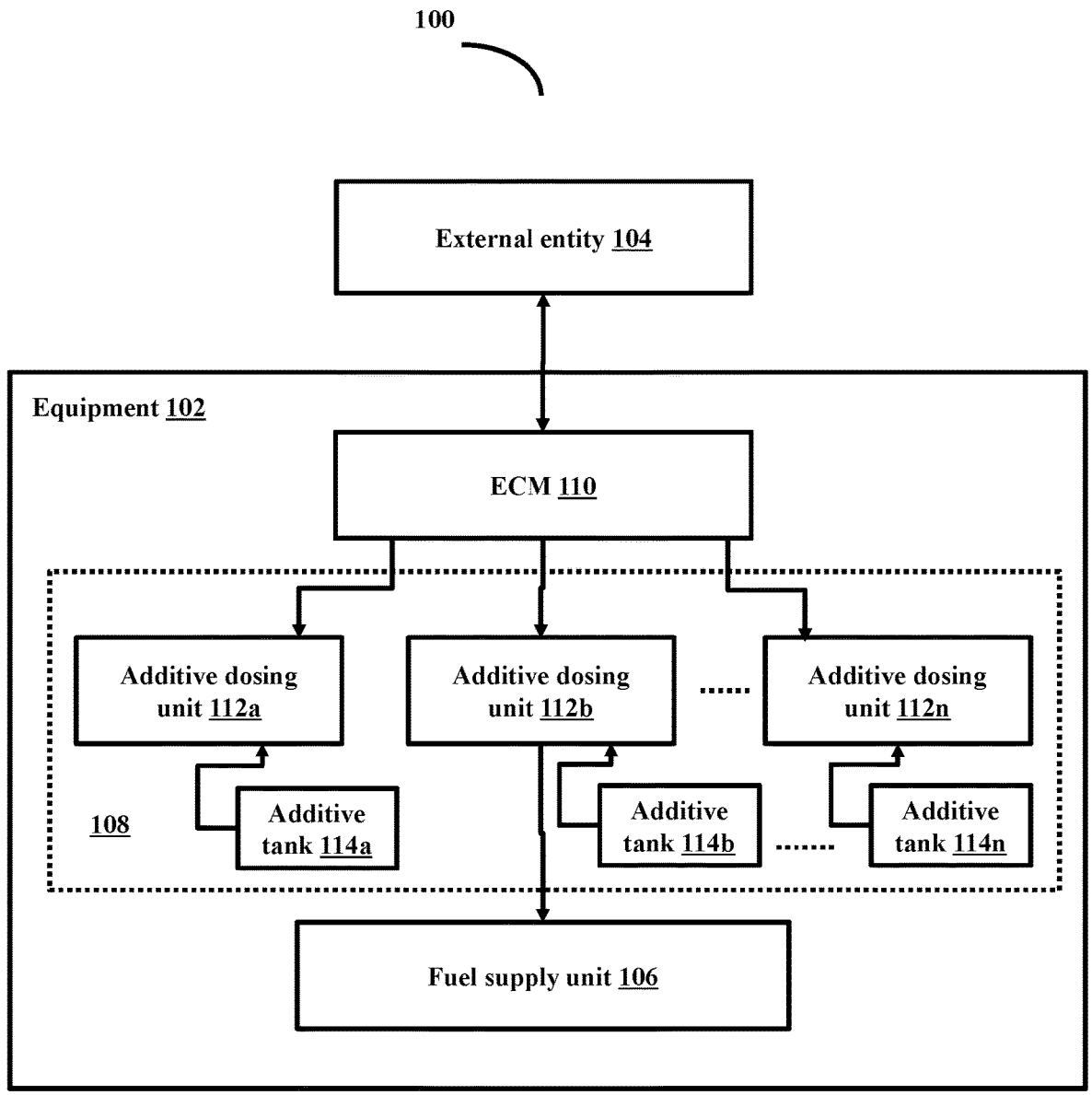
Figure 1C:
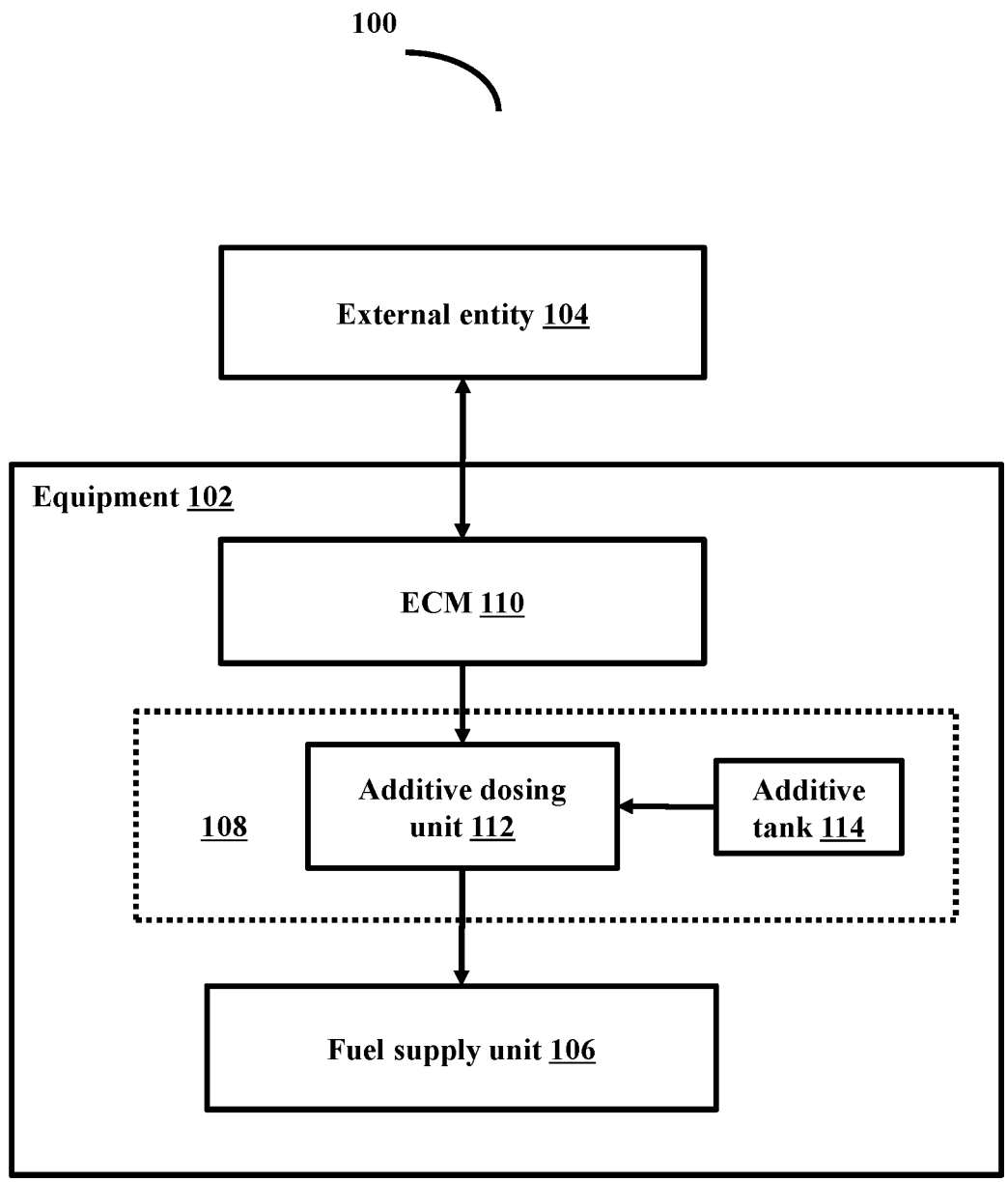

In an embodiment, the additive dispensing device 108 includes a plurality of additive dosing units 112a-112n and a plurality of additive tanks 114a-114n, wherein each additive dosing unit may be coupled with the fuel supply unit 106 and the additive tank, as depicted in FIG. 1b. In another embodiment, the additive dispensing device 108 includes a single additive dosing unit 112 coupled with the fuel supply unit 106 and the additive tank 114, as depicted in FIG. 1c. The additive dispensing device 108 may include any number of additive dosing devices, based on the type of the equipment 102.

The additive tank 114 may be a container that stores the one or more additives, which have to be added into the fuel supply unit 106. In an example, as depicted in FIG. 1b, the plurality of additive tanks 114a-114n may store the same additives. In another example, the plurality of additive tanks 114a-114n may store the different additives. The additive dosing unit 112a-112n/112 comprises a positive feeding/dispensing pump with a dosing nozzle. In an example, the dosing nozzle may be of different types like, but is not limited to, a flow to fine mist spray as atomization.

The additive dosing unit 112a-112n/112 receives instructions from the ECM 110 for dosing the one or more additives into the fuel supply unit 106. The instructions may include the one or more additives and quantity of the one or more additives for dosing into the fuel supply unit 106, at a current instance of time. On receiving the instructions from the ECM 110, the additive dosing unit 112a-112n/112 fetches the instructed quantity of the one or more additives from the respectively coupled additive tank 114a-114n/114 at the current instance of time and doses the fetched quantity of the one or more additives into the fuel supply unit 106 through the positive feeding pump.

In an embodiment, the additive dosing unit 112a-112n/112 may dose the one or more additives into at least one site of the fuel supply unit 106. The site (i.e., point of dosing) may correspond to any component of the fuel supply unit 106, wherein the fuel does not burn. The site of dosing the one or more additives may be determined at the time of installation of the fuel supply unit 106 in the equipment 102. In an example, the site may be fixed. In another example, the site may be changed depending on results of operations of the equipment 102.

In an embodiment, the site for dosing the one or more additives into the fuel supply unit 106 may be anywhere before the combustion/burning of the fuel in the fuel supply unit 106. Thus, the one or more additives may not be dosed in either the fuel burner or the combustion chamber/site of the fuel supply unit 106, where the fuel burns. The one or more additives may be dosed in other parts of the fuel supply unit 106 such as, but are not limited to, the fuel pipe, the fuel distributor, the common rail, and so on. The site determined for dosing the one or more additives into the fuel supply unit 106 depends on the type of the equipment 102. In an example, if the equipment 102 is at least one of, the fuel engines, the oil-fired burners and furnaces, or the like, the one or more additives may be dosed into the fuel at the fuel pipe after the arrival of the fuel at the fuel pipe from the fuel pump and before reaching the fuel burner or the combustion chamber of the equipment 102. In another example, if the equipment 102 is the direct injection or common rail direct injection engine, the one or more additives may be dosed into the fuel at the fuel distributor or at the common rail or the fuel pipe before the flow of the fuel into the combustion chamber of the equipment 102.

Figure 1D:
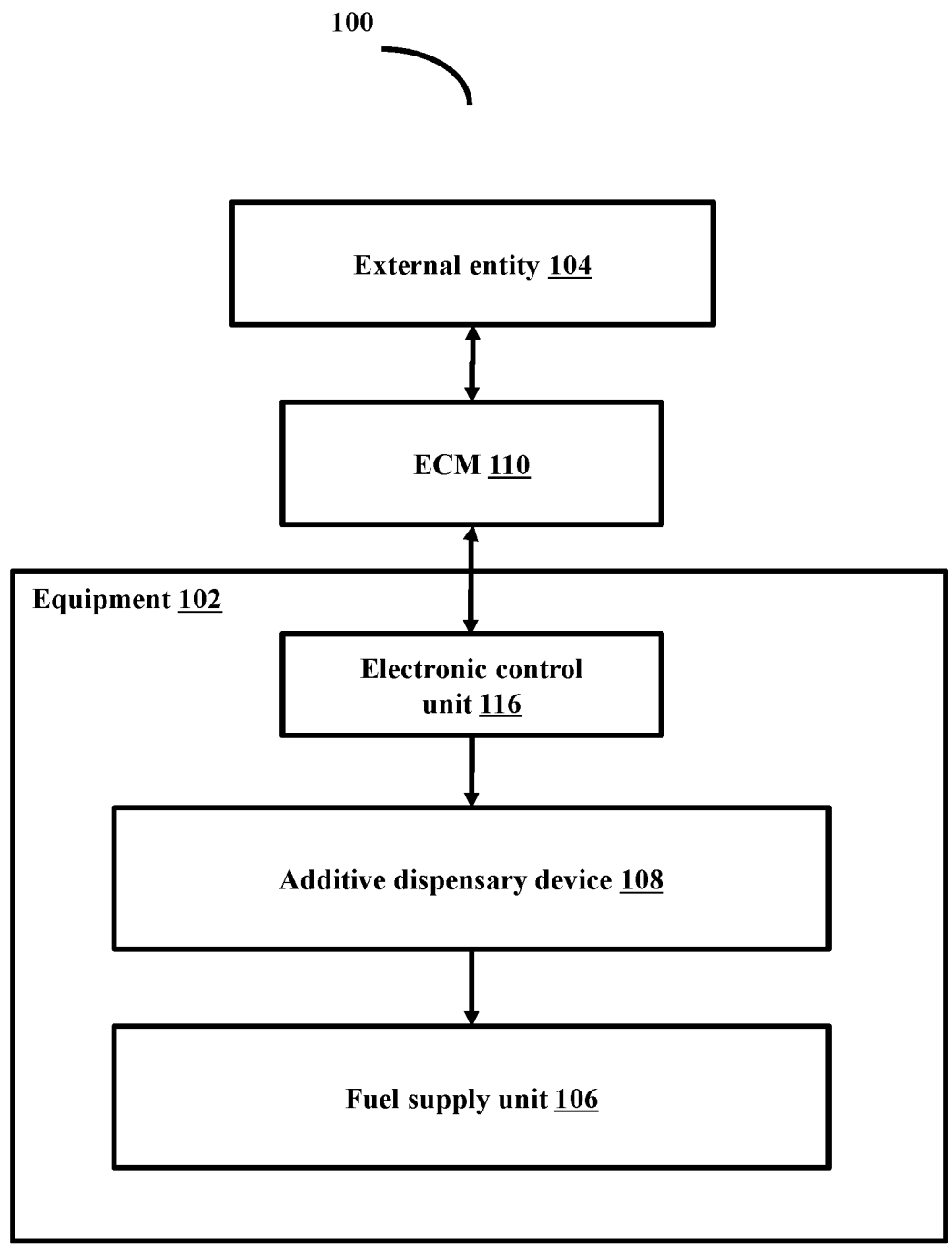

The ECM 110 may be configured to manage real-time dosing of the one or more additives into the fuel supply unit 106. In an embodiment, as depicted in FIG. 1a, the ECM 110 may be an electronic control unit 116 associated with the equipment 102, which manages the real-time dosing of the one or more additives into the fuel supply unit 106 and performs other functions related to the equipment 102 or one or more systems/sensors/modules associated with the equipment 102. In another embodiment, as depicted in FIG. 1d, the ECM 110 may be a dedicated control unit, which communicates with the electronic control unit 116 present in the equipment 102 to manage the real-time dosing of the one or more additives into the fuel supply unit 106.

The ECM 110 referred herein may be at least one of, but is not limited to, a microcontroller, a System on Chip (SoC), an integrated chip (IC), a microprocessor based programmable consumer electronic device, and so on. The ECM 110 may be communicatively coupled to the components of the equipment 102 like, the additive dispensing unit 108, the fuel supply unit 106, and so on, using at least one of, the Internet, a wired network (a Local Area Network (LAN), a Controller Area Network (CAN) network, a Universal Asynchronous Receiver/Transmitter (UART), a bus network, Ethernet and so on), a wireless network (a Wi-Fi network, a cellular network, a Wi-Fi Hotspot, Bluetooth, Zigbee and so on), and so on. The ECM 110 controls the operations of the components of the equipment 102.

The ECM 110 also communicates with the external entity 104 (such as, the external server, an external database, other equipment, or the like) using a communication network. Examples of the communication network may be, but are not limited to, the Internet, a wired network (a Local Area Network (LAN), a Controller Area Network (CAN) network, a bus network, Ethernet and so on), a wireless network (a Wi-Fi network, a cellular network, a Wi-Fi Hotspot, Bluetooth, Zigbee and so on) and so on.

The ECM 110 manages the real-time dosing of the one or more additives into the fuel supply unit 106, by determining dosage of the one or more additives to be dosed into the fuel supply unit 106. In an embodiment, the dosage of the one or more additives corresponds to the one or more additives, and the quantity/amount of the one or more additives to be dosed into the fuel supply unit 106, at the current instance of time.

For determining the dosage of the one or more additives to be dosed into the fuel supply unit 106, the ECM 110 captures operating conditions of the equipment 102 at a current operating cycle of the equipment 102/at the current instance of time. The operating conditions of the equipment 102 may define a relationship between the components of the equipment 102 (from fuel supply to an exhausting system of the equipment 102) and the additive dispensing device 108. Examples of the operating conditions may be, but are not limited to, type of the equipment 102, type of the one or more fuels on which the equipment 102 operates, climate conditions, stationary operating parameters of the equipment 102, usage related parameters, burner or furnace based parameters, and so on. The operating conditions may vary, based on the type of the equipment 102. The operating conditions may include the type of the equipment 102, the type of the one or more fuels on which the equipment 102 operates, the climate conditions, and the stationary operating parameters, if the equipment 102 is the stationary engine. The operating conditions may include the type of the equipment 102, the type of the one or more fuels on which the equipment 102 operates, the climate conditions, the stationary operating parameters, and the usage related parameters, if the equipment 102 is the mobility engine. The operating conditions may include the burner or furnace based parameters if the equipment 102 is the fuel-oil fired furnace or burner.

Examples of the stationary operating parameters may be, but are not limited to, fuel to air ratio, fuel quantity, fuel flow rate, engine cleanness, exhaust gases and associated levels, air gases constitution, load, torque, Rotation Per Minute (RPM) of the equipment 102, temperature, engine timings, and so on. Examples of the usage related parameters may be, but are not limited to, driving related parameters, physical characteristics of the vehicle, road related parameters, terrains, and so on. Examples of the burner or furnace based parameters may be, but are not limited to, viscosity of fuel, a type of a primary fuel, a type of a secondary fuel, flow rate, energy required for operating the equipment, temperature, time, speed, and so on.

The ECM 110 captures the operating conditions of the equipment 102 using one or more sensors. Examples of the sensors may be, but are not limited to, a temperature sensor, a speed sensor, an hour sensor, a traffic light sensor, a magnetic sensor, an Infrared (IR) sensor, an ultrasonic sensor, a fuel sensor, a pressure sensor, an exhaust gas sensor, an inertial sensor, a load cell sensor, and so on. A function of each sensor may be intuitively inferred by one of ordinary skill in the art based on its name, and thus, its detailed description is omitted. It should be noted that embodiments herein are not limited to the sensors described above, and any other sensors (including those described above) may be used to collect the operating conditions of the equipment 102 without otherwise deterring the intended functions of the features of the embodiments as can be deduced from this description.

The ECM 110 determines the dosage of the one or more additives for dosing into the fuel supply unit 106, based on the collected operating conditions of equipment 102.

Figure 3:
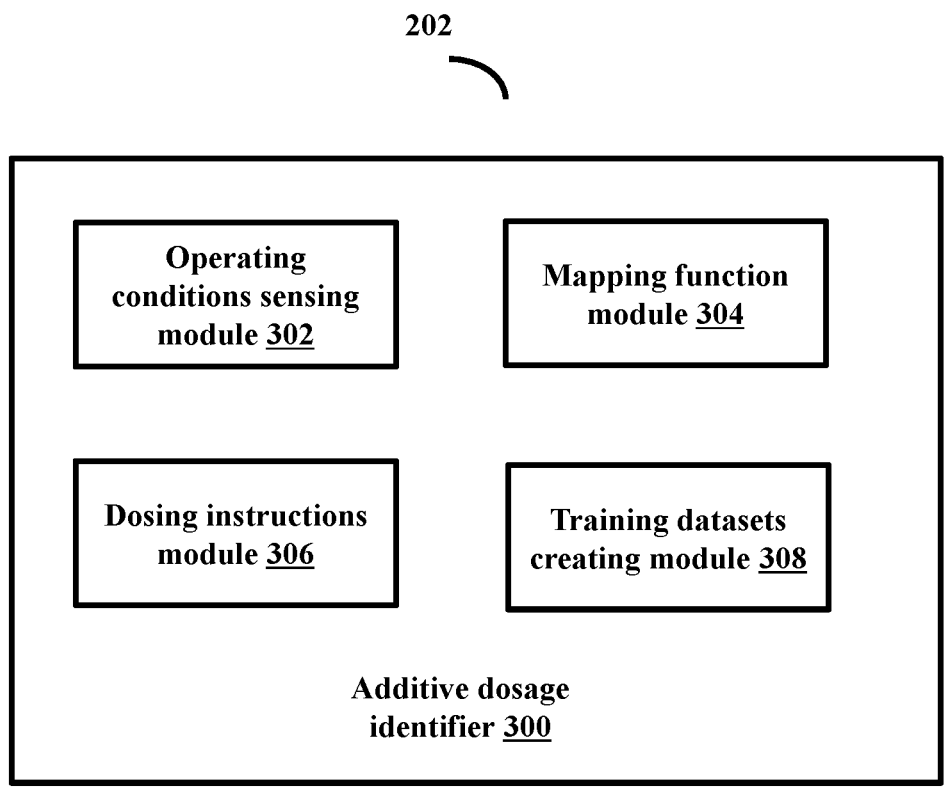
FIG. 3 depicts an additive dosage identifier performable on the ECM for determining the dosage of the one or more additives, according to embodiments as disclosed herein.

In an embodiment, the ECM 110 determines the dosage of the one or more additives for dosing into the fuel supply unit 106 by processing the captured operating conditions of the equipment 102 using a mapping function module 304 (as depicted in FIG. 3). Examples of the mapping function module 304 may be, but are not limited to, a machine learning (ML), a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on. The mapping function module 304 includes a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers may vary based on the type of the mapping function module 304. In an example, the mapping function module 304 may include an input layer, an output layer, and a hidden layer. The input layer receives an input (for example: the operating conditions of the equipment 102) and forwards the received input to the hidden layer. The hidden layer transforms the input received from the input layer into a representation, which may be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The ECM 110 receives the mapping function module 304 from the external entity 104 using the communication network. The received mapping function module 304 may be a trained mapping function module. The trained mapping function module 304 may be a trained neural network in which a number of layers, a sequence for processing the layers and parameters related to each layer may be known and fixed for each of the one or more tasks. Examples of the parameters related to each layer of the mapping function module 304 may be, but are not limited to, activation functions, biases, input weights, output weights, and so on, related to the layers of the neural network.

Alternatively, the ECM 110 trains the mapping function module 304 to determine the dosage of the one or more additives to be dosed into the fuel supply unit 106 for the operating conditions of the equipment 102 captured at the current instance of time. In an example, the ECM 110 may train the mapping function module 304 using an offline Reinforcement Learning (RL) method. In another example, the ECM 110 may train the mapping function module 304 using a supervised learning method, when the training of the mapping function module 304 using the offline RL method fails. In yet another example, the ECM 110 may train the mapping function module 304 using an online RL method. On training the mapping function module 304, the ECM 110 stores the trained mapping function module 304.

For training the mapping function module 304 using the offline RL method, the ECM 110 collects training dataset(s). The ECM 110 may fetch stored data related to the equipment 102 as the training dataset, wherein the stored data may be data that has been monitored over time with respect to previous operations of the equipment 102. Alternatively, the ECM 110 may receive the training dataset from the external entity 104. The training dataset may be related to the equipment 102. Alternatively, the training dataset may be related to similar equipment. The training dataset may have different states, actions, and feedback. The different states may correspond to the different operating conditions of the equipment 102 monitored during the previous operations of the equipment 102. The actions may correspond to at least one of, but is not limited to, the dosage of the one or more additives, fuel consumption of the equipment 102, and so on, monitored for the various operating conditions of the equipment 102 during the previous operations of the equipment 102. The feedback may correspond to at least one of, but is not limited to, an emission profile of the equipment 102, efficiency profile of the equipment 102, and so on, monitored for the various operating conditions and the dosage of the one or more additives during the previous operations of the equipment 102. The emission profile of the equipment 102 may comprise at least one of, but is not limited to, exhaust/emission gases and soot. Examples of the emission gases may be, but are not limited to, oxides of nitrogen ($NO_X$), oxide of sulphur ($SO_X$), oxide of carbon ($CO_X$), ammonia ($NH_3$), or any other similar emission gases. The efficiency profile of the equipment 102 may comprise of at least one of, but is not limited to, mileage, energy produced, and so on. The ECM 110 applies the RL method on the collected training dataset to train the mapping function module 304 for the real-time dosing of the one or more additives into the fuel supply unit 106. The trained mapping function module 304 using the RL method may optimize the determination of the dosage of the one or more additives for the given operating conditions of the equipment, since the emission profile and the efficiency profile of the equipment 102 have been used as the feedback. Thereby, providing better emission profile and efficiency profile.

For training the mapping function using the supervised learning method, the ECM 110 collects compressed training dataset(s). The compressed training dataset includes only the states and the actions (without including the feedback). The ECM 110 applies the supervised learning method on the collected compressed training dataset to train the mapping function module 304 for the real-time dosing of the one or more additives into the fuel supply unit 106. As the supervised learning method uses the compressed training dataset, storing or accessing the compressed training dataset from the external entity 104 may be economical compared to storing and accessing the dataset including the states, the actions, and the feedback. In addition, the compressed training dataset may be processed faster compared to the training dataset including the states, the actions, and the feedback.

For training the mapping function using the online RL learning method, the ECM 110 collects the operating conditions of the equipment 102 (i.e., the states) monitored during the previous operations of the equipment 102. The ECM 110 applies the online RL learning method on the collected operating conditions of the equipment 102 and determines the dosage of the one or more additives, the fuel consumption of the equipment 102, or the like (i.e., the actions) for the corresponding operating conditions of the equipment 102. Examples of the online RL learning method may be, but are not limited to, Q-learning, Proximal Policy Optimization, and so on. The ECM 110 feeds the determined dosage of the one or more additives, the fuel consumption, or the like, for the operating conditions of the equipment 102 to a simulator module. In an example, the simulator module may be a hardware device. In another example, the simulator module may be a software module (a virtual simulator). The simulator module provides the emission profile and/or the efficiency profile of the equipment 102 corresponding to the received dosage of the one or more additives. The emission profile and/or the efficiency profile of the equipment 102 act as the feedback signal to the online RL method. Therefore, the ECM 110 uses the online RL method to train the mapping function module 304 by updating the parameters of each layer of the mapping function module 304, based on the feedback generated by the simulator module.

Thus, the trained mapping function provides information about the states and the corresponding actions and feedback.

The ECM 110 processes the captured operating conditions of the equipment 102 using the trained mapping function module 304 to determine the dosage of the one or more additives for the captured operating conditions of the equipment 102, at the current instance of time.

The ECM 110 enables the additive dispensing device 108 to dose the one or more additives into the fuel supply unit 106 of the equipment 102, based on the determined dosage of the one or more additives.

The ECM 110 may also be configured to record at least one of, the emission profile, the efficiency profile, and so on, of the equipment 102 with respect to the operating conditions of the equipment 102 and the corresponding dosage of the one or more additives, the fuel consumption, or the like of the equipment 102. The ECM 110 may create the training dataset using the recorded emission profile of the equipment 102, the efficiency profile of the equipment 102, the operating conditions of the equipment 102, the dosage of the one or more additives, the fuel consumption of the equipment 102, and so on. The ECM 110 stores the created training dataset. In an embodiment, the ECM 110 may use the created training dataset to optimize the mapping function module 304 by updating the parameters of each layer of the mapping function module 304 based on the created training dataset. In another embodiment, the ECM 110 may also communicate the created training dataset to the external entity 104.

In an embodiment, the ECM 110 may also be configured to diagnose malfunctions or faults associated with the operation(s) of the equipment 102 and to recommend the one or more additives to solve the diagnosed malfunctions of the equipment 102. Examples of the malfunctions/faults may be, but are not limited to, clogging of injection nozzle of the equipment 102, diesel particulate filter (DPF) clogs, and so on. For diagnosing the malfunctions, the ECM 110 collects parameters of the equipment 102 and corresponding values using the sensors, at the current operating cycle of the equipment. Examples of the parameters may be, but are not limited to, air to fuel ratio, quantity of the fuel, fuel flow rate, engine cleanness, exhaust gases and associated levels, air gases constitution, load, torque, Rotation Per Minute (RPM) of the equipment 102, temperature, engine timings, and so on. The ECM 110 compares the collected parameters of the equipment 102 with pre-defined parameters of the equipment 102 and corresponding values. The parameters and the corresponding values may be pre-defined by an Original Equipment Manufacturer (OEM) or the equipment 102. If the collected parameters and the corresponding values do not deviate from the pre-defined parameters and the corresponding values, the ECM 110 detects that the equipment 102 is operating properly. If the collected parameters and the corresponding values deviate from the pre-defined parameters and the corresponding values, the ECM 110 detects that the equipment 102 is associated with the malfunctions or faults. On detecting the malfunctions or faults associated with the equipment 102, the ECM 110 recommends the one or more additives to resolve the detected malfunctions or faults associated with the equipment 102. The ECM 110 recommends the one or more additives to resolve the detected malfunctions or faults associated with the equipment 102, based on an additives mapping. The additives mapping includes a mapping of the additives with the malfunctions or faults associated with the equipment 102.

In an example, if the fuel consumption or the air to fuel ratio is disturbed (i.e., deviated from the pre-defined corresponding values), the ECM 110 detects the fault like clogging of the injection nozzle. In another example, if the clogging (an example of engine cleanliness parameter) is determined using the sensors, the ECM 110 detects the fault like DPF clogs. In such a scenario, the ECM 110 may generate a signal to a suitable component of the equipment 102 to regenerate such DPF in active or passive forms using a fuel born catalyst.

The external entity 104 referred herein may be least one of, but is not limited to, a cloud computing device (can be a part of a public cloud or a private cloud), a server, a database, a computing device, and so on. The server may be at least one of a standalone server, a server on a cloud, or the like. The computing device may be, but is not limited to, a personal computer, a notebook, a tablet, desktop computer, a laptop, a handheld device, a mobile device, and so on. Also, the external entity 104 may be at least one of, a microcontroller, a processor, a System on Chip (SoC), an integrated chip (IC), a microprocessor based programmable consumer electronic device, and so on.

The external entity 104 may be configured to collect the training datasets from the ECM 110 of the equipment 102 and store the training datasets. The external entity 104 may also be configured to communicate the training dataset(s) to the ECM 110 of the equipment 102 for training the mapping function module 304. The external entity 104 may also be configured to train the mapping function module 304 based on the received training datasets. The external entity 104 trains the mapping function module 304 similar to the ECM 110, and thus a repeated description thereof is omitted for conciseness. The external entity 104 communicates the trained mapping function module 304 to the equipment 102 for managing the real-time dosing of the one or more additives into the fuel supply unit 106.

FIGS. 1*a*, 1*b*, 1*c*, and 1*d* show exemplary blocks of the dosing system 100, but it is to be understood that other embodiments are not limited thereon. In other embodiments, the dosing system 100 may include less or more number of blocks. Further, the labels or names of the blocks are used only for illustrative purpose and does not limit the scope of the embodiments herein. One or more blocks can be combined together to perform same or substantially similar function in the dosing system 100.

Figure 2:
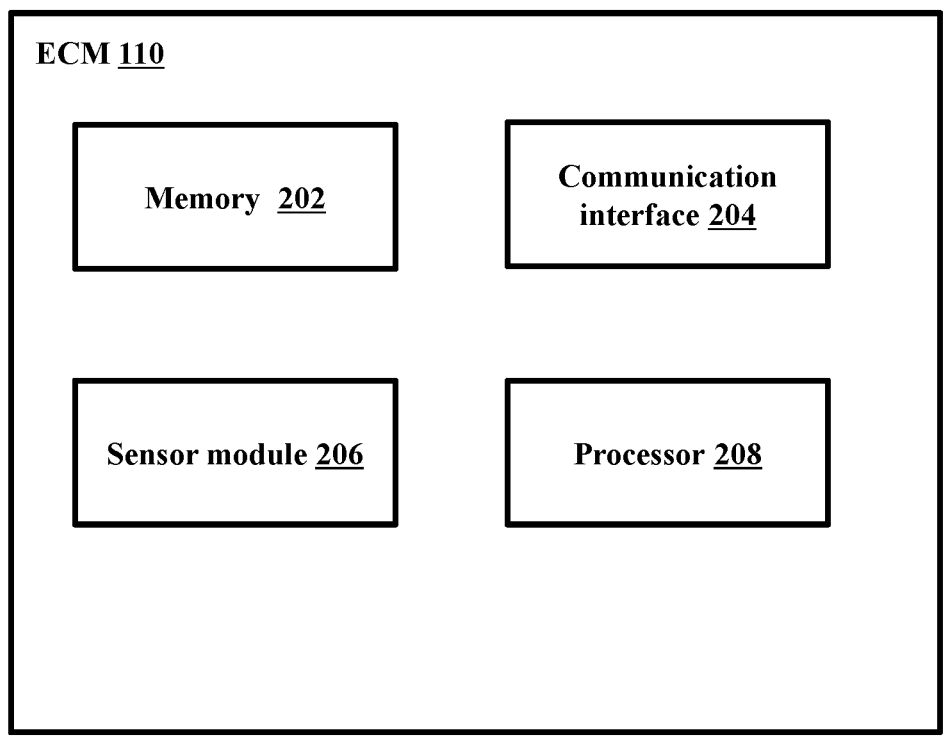
FIG. 2 is an example block diagram depicting various components of an Electronic Control Module (ECM) for determining dosage of the one or more additives, according to embodiments as disclosed herein.

FIG. 2 is an example block diagram depicting various components of the ECM 110 determining dosage of the one or more additives, according to embodiments as disclosed herein.

The ECM 110 includes a memory 202, a communication interface 204, a sensor module 206, and a processor 208. The ECM 110 may also include Input/Output (I/O) ports, communication ports, signal processing circuitries, and so on (not shown).

The memory 202 may store at least one of, the operating conditions of the equipment 102, the dosage of the one or more additives, the emission profile, the efficiency profile, the fuel consumption of the equipment 102, information about at least one of, the type of the equipment 102, the type of the one or more fuels, the one or more additives, or the like, the training datasets, the pre-defined parameters of the equipment 102 and corresponding values, the additive mapping, and so on. The memory 202 may also store an additive dosing identifier 300, which may be executed by the processor 208 for managing the real-time dosing of the one or more additives into the fuel supply unit 106. Examples of the memory 202 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 202 may include one or more computer-readable storage media. The memory 202 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 204 may be configured to enable the ECM 110 to communicate with the components of the equipment 102 using at least one of, but are not limited to, the Internet, a wired network (a Local Area Network (LAN), a Controller Area Network (CAN) network, a Universal Asynchronous Receiver/Transmitter (UART), a bus network, Ethernet and so on), a wireless network (a Wi-Fi network, a cellular network, a Wi-Fi Hotspot, Bluetooth, Zigbee and so on), and so on. The communication interface 204 may also be configured to enable the ECM 110 to communicate with the external entity 104 using the communication network.

The sensor module 206 may include one or more sensors such as, but are not limited to, a temperature sensor, a speed sensor, an hour sensor, a traffic light sensor, a magnetic sensor, an Infrared (IR) sensor, an ultrasonic sensor, a fuel sensor, a pressure sensor, an exhaust gas sensor, an inertial sensor, a load cell sensor, and so on. The sensors may be used to capture the operating conditions of the equipment 102.

The processor 208 may be at least one of, but is not limited to, a single processer, a plurality of processors, multiple homogenous cores, multiple heterogeneous cores, multiple Central Processing Units (CPUs) of different kinds, and so on. The one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The processor 208 may be configured to manage the real-time dosing of the one or more additives into the fuel supply unit 106. The processor 208 determines the dosage of the one or more additives to be dosed into the fuel supply unit 106, based on the operating conditions of the equipment 102. The dosage of the one or more additives indicates the one or more additives, and the quantity of the one or more additives to be dosed into the fuel supply unit 106, at the current instance of time. The processor 208 executes the additive dosage identifier 300 to determine the dosage of the one or more additives.

The processor 208 may also be configured to diagnose the malfunctions or the faults associated with the operation(s) of the equipment 102 and to recommend the one or more additives to solve the diagnosed malfunctions of the equipment 102.

As depicted in FIG. 3, the additive dosage identifier 300 includes an operating conditions sensing module 302, a mapping function module 304, a dosing instructions module 306, and a training dataset creating module 308.

The operating conditions sensing module 302 may be configured to capture the operating conditions of the equipment 102 using the sensors of the sensor module 206.

The mapping function module 304 may be configured to determine the dosage of the one or more additives to be dosed into the fuel supply unit 106. The mapping function module 304 may comprise of a plurality of neural network layers. Each layer has a plurality of weight values and performs a layer operation through calculation of a previous layer and an operation of a plurality of weights/coefficients. The mapping function module 304 may be trained using at least one learning method to determine the dosage of the one or more additives to be dosed into the fuel supply unit 106. Examples of the learning method may be, but are not limited to, supervised learning, unsupervised learning, semi-supervised learning, Reinforcement Learning, regression-based learning, and so on. A function associated with the learning method may be performed through the non-volatile memory, the volatile memory, and the processor 208. The processor 208 determines the dosage of the one or more additives to be dosed into the fuel supply unit 106, in accordance with a predefined operating rule of the mapping function module 304 stored in the non-volatile memory and the volatile memory. Here, being provided through learning means that, by applying the learning method to the training dataset, a predefined operating rule or AI model of a desired characteristic is made. The dosing of the one or more additives may be determined in the ECM 110 itself in which the learning according to an embodiment is performed, and/or may be implemented through a separate external entity 104.

The mapping function module 304 may be configured to determine the dosage of the one or more additives to be dosed into the fuel supply unit 106 by processing the operating conditions of the equipment 102.

In an embodiment, the mapping function module 304 (i.e., the trained mapping function module) may be configured on the ECM 110 by the external entity 104 to determine the dosage of the one or more additives for the operating conditions of the equipment 102. In another embodiment, the processor 208 may be configured to train the mapping function module 304 to determine the dosage of the one or more additives for the operating conditions of the equipment

102. In an example, the processor 208 may train the mapping function module 304 using the offline RL method. In another example, the processor 208 may train the mapping function module 304 using the supervised learning method. In another example, the processor 208 may train the mapping function module 304 using the online RL method.

The dosing instructions module 306 may be configured to communicate the instructions to the additive dispensing device 108 to dose the one or more additives into the fuel supply unit 106, on receiving the dosage of the one or more additives from the mapping function module 304. The instructions indicate the dosage of the one or more additives to be dosed into the fuel supply unit 106.

The training dataset creating module 308 may be configured to create the training dataset, which may be used to update the mapping function module 304. Updating the mapping function module 304 refers to updating the parameters of each layer of the mapping function module 304 based on the created training dataset. The training dataset creating module 308 creates the training dataset by monitoring the emission profile and the efficiency profile of the equipment 102 with respect to the operating conditions of the equipment 102, and the dosage of the one or more additives over time. The training dataset creating module 308 may communicate the created training dataset to the external entity 104.

FIGS. 2 and 3 show exemplary blocks of the ECM 110, but it is to be understood that other embodiments are not limited thereon. In other embodiments, the ECM 110 may include less or more number of blocks. Further, the labels or names of the blocks are used only for illustrative purpose and does not limit the scope of the embodiments herein. One or more blocks can be combined together to perform same or substantially similar function in the ECM 110.

Figure 4:
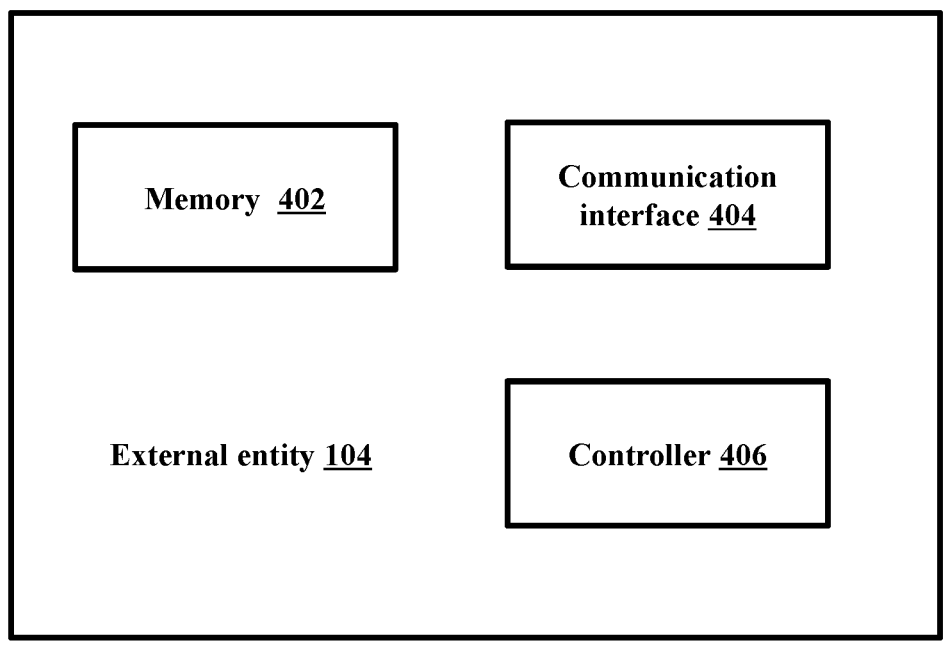
FIG. 4 is an example diagram depicting components of an external entity, according to embodiments as disclosed herein.

FIG. 4 is an example diagram depicting components of the external entity 104, according to embodiments as disclosed herein. The external entity 104 includes a memory/database 402, a communication interface 404, and a controller 406.

The memory/database 402 may store at least one of, information about equipment 102, the training datasets received from the equipment 102, the mapping function module, and so on. Examples of the memory 402 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on.

The communication interface 404 may be configured to enable the external entity 104 to communicate with the equipment 102 using the communication network.

The controller 406 may be at least one of, but is not limited to, a single processer, a plurality of processors, multiple homogenous cores, multiple heterogeneous cores, multiple Central Processing Units (CPUs) of different kinds, and so on. The one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 406 may be configured to train the mapping function module 304 to determine the dosage of the one or more additives, based on the training datasets received from the ECM 110 of the equipment 102. In an example, the controller 406 may train the mapping function module 304 by applying the offline RL method on the training dataset that includes the states, the actions, and the feedback. In another example, the controller 404 may train the mapping function module 304 by applying the supervised learning method on the compressed dataset including the states and the actions. In another example, the controller 406 may train the mapping function module 304 using the online RL method.

The controller 406 may also be configured to configure the trained mapping function module 304 on the ECM 110 of the equipment 102.

FIG. 4 shows exemplary blocks of the external entity 104, but it is to be understood that other embodiments are not limited thereon. In other embodiments, the external entity 104 may include less or more number of blocks. Further, the labels or names of the blocks are used only for illustrative purpose and does not limit the scope of the embodiments herein. One or more blocks can be combined together to perform same or substantially similar function in the external entity 104.

FIG. 5 depicts an example equipment 102, wherein the one or more additives may be dosed into the fuel supply unit 106 based on the real-time operating conditions of the equipment 102, according to embodiments as disclosed herein. The equipment 102 includes the ECM 110, the additive dispensing device 108 and the fuel supply unit 106. In an example herein, the additive dispensing device 108 includes three additive dosing devices coupled with the respective additive tanks 114a-114c. In an example herein, the fuel supply unit 106 includes a common rail, a fuel pump, a fuel pipe, a fuel distributor, an engine cylinder, a burner, a furnace, and so on.

The ECM 110 captures the operating conditions of the equipment 102 using the sensors. The ECM 110 processes the operating conditions of the equipment 102 to determine the dosage of the one or more additives to be added into the fuel supply unit 106. In an embodiment the ECM 110 processes the operating conditions of the equipment 102 using the mapping function module 304 to determine the dosage of the one or more additives. The dosage of the one or more additives indicates the one or more additives, and the quantity of the one or more additives to be added into the fuel supply unit 106, at the current instance of time.

The ECM 110 provides the instructions to the additive dispensing device 108, wherein the instructions indicate the dosage of the one or more additives to be dosed into the fuel supply unit 106. The additive dispensing device 108 enables three additive dosing units 112a-112c (for example) to dose the determined dosage of the one or more additives into the fuel supply unit 106. The additive dosing unit 112a-112c fetches the instructed quantity of the one or more additives from the respectively coupled additive tank 114a-114c and doses the fetched quantity of the one or more additives into the at least one site of fuel supply unit 106 through the positive feeding pump, which has the dosing nozzle. The site for dosing the one or more additives may be defined at the installation of the fuel supply unit 106 in the equipment 102. In an example, for the example equipment 102, as depicted in FIG. 5, the one or more additives may be dosed into the one or more sites of the fuel supply unit 106 such as, but are not limited to, the fuel pipe, the fuel distributor, and the common rail (i.e., before the fuel reaching into the combustion chamber).

FIG. 6 depicts an example equipment 102, wherein the equipment 102 is a common rail direct injection engine, wherein the one or more additives may be dosed into the fuel supply unit 106 based on the real-time operating conditions of the equipment 102, according to embodiments as disclosed herein. The equipment/common rail direct injection engine 102 includes the ECM 110, the additive dispensing device 108 and the fuel supply unit 106. In an example herein, the ECM 110 is coupled with the electronic control unit 116 of the common rail direct injection engine 102. The additive dispensing device 108 includes the additive dosing unit(s) 112 coupled with the additive tank 114. The fuel supply unit 106 includes a common rail, a regulator, one or more fuel injectors, a fuel tank, a fuel pump, a filter, a gear pump, an electrical shut-off device, and so on.

The ECM 110 captures the operating conditions of the equipment 102 using the sensors. Alternatively, the ECM captures the operating conditions of the equipment 102 by communicating with the electronic control unit 116 of the equipment 102, wherein the electronic control unit 116 captures the operating conditions of the equipment 102 using the sensors. The ECM 110 processes the operating conditions of the equipment 102 to determine the dosage of the one or more additives to be added into the fuel supply unit 106. The dosage of the one or more additives indicates the one or more additives, and the quantity of the one or more additives to be dosed into the fuel supply unit 106, at the current instance of time.

The ECM 110 provides the instructions to the additive dispensing device 108, wherein the instructions indicate the dosage of the one or more additives to be dosed into the fuel supply unit 106. The additive dispensing device 108 enables the one or more additive dosing units 112 to dose the determined dosage of the one or more additives into the fuel supply unit 106. The additive dosing unit 112 fetches the instructed quantity of the one or more additives from the additive tank 114 and doses the fetched quantity of the one or more additives into the at least one site/component of the fuel supply unit 106 through the positive feeding pump, which has the dosing nozzle. The site for dosing the one or more additives may be defined at the installation of the fuel supply unit 106 in the equipment 102. In an example, for the example equipment 102, as depicted in FIG. 6, the one or more additives may be dosed into the one or more sites of the fuel supply unit 106, such as, but are not limited to, the fuel distributor or the common rail or the fuel pipe, before the flow of the fuel into the combustion chamber from the injectors.

Figure 7A:
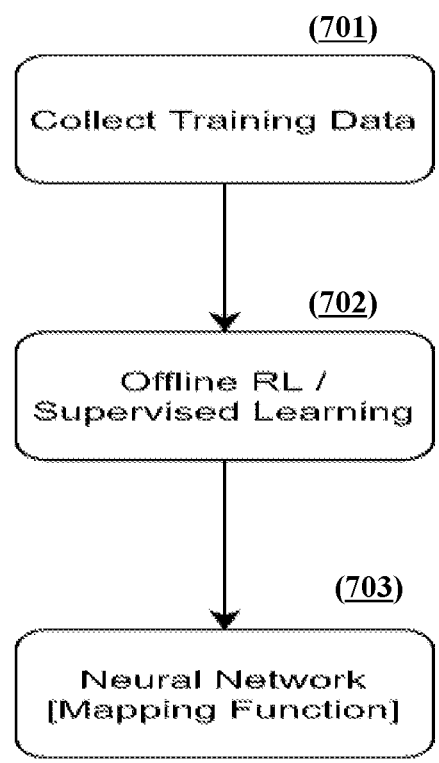
FIG. 7a is an example flow diagram depicting training of a mapping function module to determine the dosage of the one or more additives for the operating conditions of the equipment, according to embodiments as disclosed herein.

FIG. 7a is an example flow diagram depicting training of the mapping function module 304 to determine the dosage of the one or more additives for the operating conditions of the equipment, according to embodiments as disclosed herein.

At step 701, the ECM 110 (or the external entity 104) collects the training dataset. The training dataset includes the states, the actions, and the feedback, as depicted in an example table of FIG. 7b. The states correspond to the operating conditions of the equipment monitored during the previous operations of the equipment. The actions correspond to the dosage of the one or more additives dosed into the fuel supply unit 106 and/or the fuel consumption of the equipment 102 with respect to the monitored operating conditions of the equipment during the previous operations. The feedback corresponds to the emission profile and the efficiency profile of the equipment 102 with respect to the monitored operating conditions and the dosage of the one or more additives during the previous operations.

At step 702, the ECM 110 applies the offline RL method on the collected training dataset including the states, the actions, and the feedback to obtain the mapping function module 304. If the ECM 110 does not obtain the mapping function module 304 using the offline RL method, at step 702, the ECM 110 applies the supervised learning method on the collected training dataset including the states and the actions to obtain the mapping function module 304. The mapping function module 304 may be the trained neural network (step 703).

Figure 8:
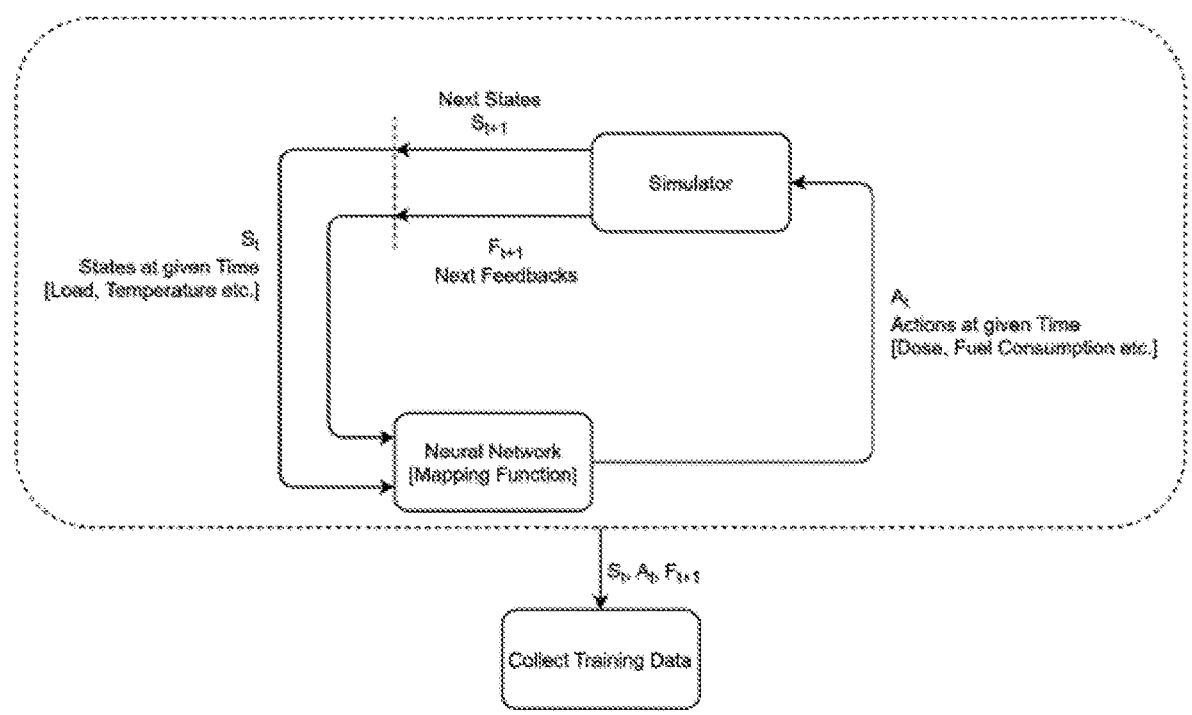
FIG. 8 is an example diagram depicting training of the mapping function module using an online Reinforcement Learning (RL) method and a simulator module, according to embodiments as disclosed herein.

FIG. 8 is an example diagram depicting training of the mapping function module 304 using the online RL method and the simulator module, according to embodiments as disclosed herein. The ECM 110 collects the operating conditions of the equipment 102 (i.e., the states) monitored during the previous operations of the equipment 102. The ECM 110 applies the online RL learning method on the collected operating conditions of the equipment 102 and determines the dosage of the one or more additives and/or the fuel consumption (i.e., the actions) for the corresponding operating conditions of the equipment 102. The ECM 110 feeds the determined dosage of the one or more additives and/or the fuel consumption for the operating conditions of the equipment 102 to the simulator module. The simulator module provides the emission profile and the efficiency profile of the equipment 102 for the received dosage of the one or more additives. The emission profile and the efficiency profile of the equipment 102 provided by the simulator module may act as the feedback to the online RL method. The ECM 110 uses the online RL method to train the mapping function module 304 by updating the parameters of the mapping function module 304, based on the feedback generated by the simulator module.

Figure 9:
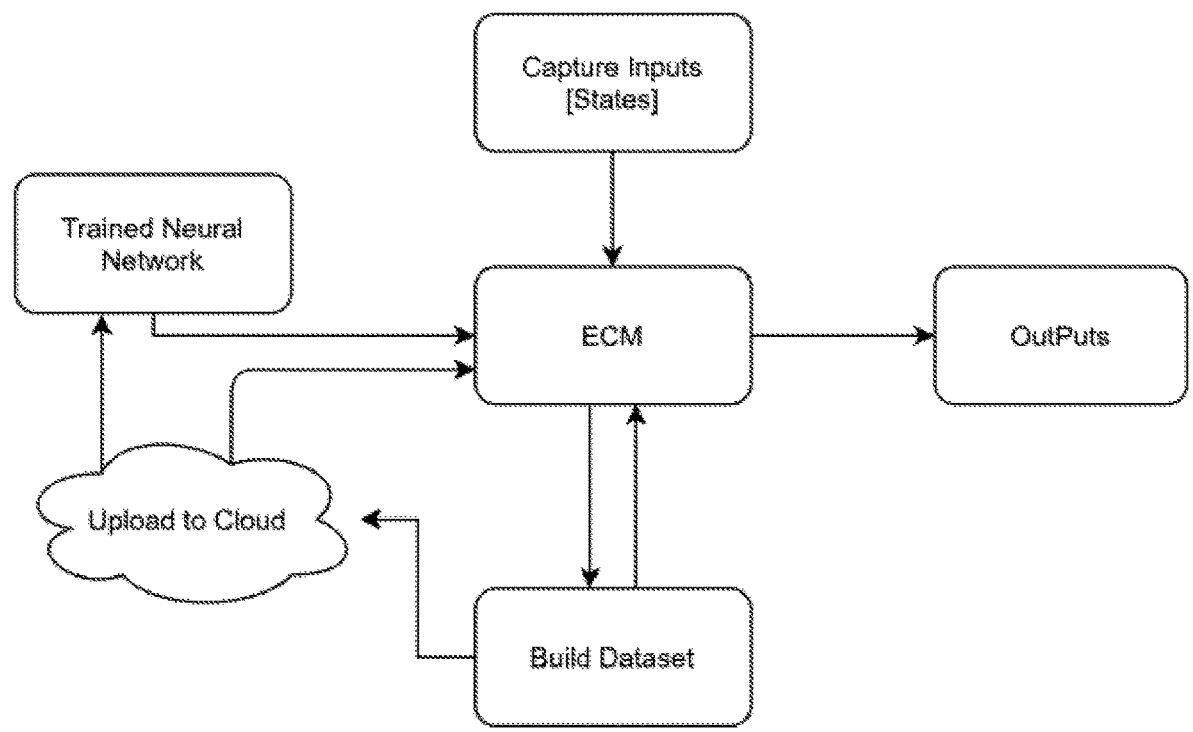
FIG. 9 is an example diagram depicting usage of the mapping function module to determine the dosage of the one or more additives to be dosed into the fuel supply unit of the equipment, according to embodiments as disclosed herein.

FIG. 9 is an example diagram depicting usage of the mapping function module 304 to determine the dosage of the one or more additives to be dosed into the fuel supply unit 106 of the equipment 102, according to embodiments as disclosed herein.

The ECM 110 captures the operating conditions (i.e., the states) of the equipment 102, at each operating cycle of the equipment 102. The ECM 110 feeds the captured operating conditions of the equipment 102 to the mapping function module 304 (i.e., the trained neural network), which determines the dosage of the one or more additives to be dosed into the fuel supply unit 106 for the received operating conditions of the equipment 102. The ECM 110 enables the additive dispensing device 108 to dose the one or more additives into the fuel supply unit 106, in accordance with the determined dosage.

The ECM 110 further records the operating conditions (the states) of the equipment 102, the determined dosage of the one or more additives and/or the fuel consumption (the actions) and the corresponding emission profile, the efficiency profile of the equipment 102, or the like of the equipment 102 (the feedback) to build/create the training dataset. The ECM 110 sends the created training dataset to the external entity 104. The ECM 110 also sends the created training dataset to other equipment to optimize/update the mapping function module 304. Thus, the mapping function module 304 may be updated in the equipment 102 as and when required.

Figure 10:
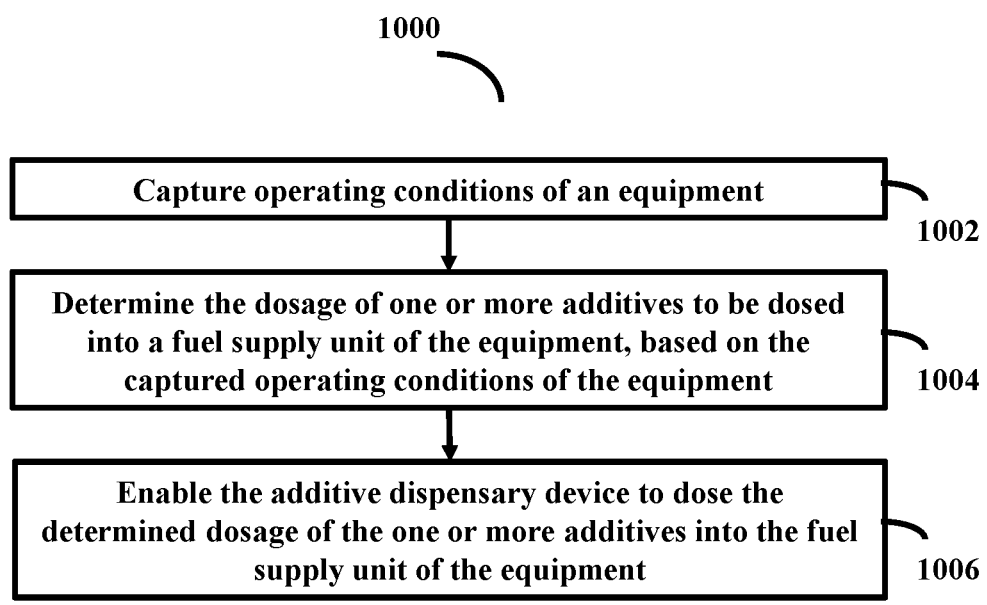
FIG. 10 is a flow diagram depicting a method for real-time dosing of the one or more additives into the fuel supply unit of the equipment, according to embodiments as disclosed herein.

FIG. 10 is a flow diagram 1000 depicting a method for real-time dosing of the one or more additives into the fuel supply unit 106 of the equipment 102, according to embodiments as disclosed herein.

At step 1002, the method includes capturing, by the ECM 110, the operating conditions of the equipment 102. The operating conditions of the equipment 102 at the current instance of time may be captured using the sensors. The operating conditions include at least one of, the type of the equipment 102, the type of one or more fuels on which the equipment 102 operates, the climate conditions, the stationary operating parameters, the usage related parameters, the furnace or burner based parameters, and so on.

At step 1004, the method includes determining, by the ECM 110, the dosage of the one or more additives to be dosed into the fuel supply unit 106 of the equipment, based on the captured operating conditions of the equipment 102. The dosage of the one or more additives includes type of the one or more additives, the quantity of the one or more additives to be dosed into the fuel supply unit 106 of the equipment 102, at the current instance of time.

At step 1006, the method includes enabling, by the ECM 110, the additive dispensing device 108 to dose the determined dosage of the one or more additives into the fuel supply unit 106 of the equipment 102. The various actions in method 1000 may be performed in the order presented, in a different order or simultaneously. Further, in some embodiments, some actions listed in FIG. 10 may be omitted.

Figure 11:
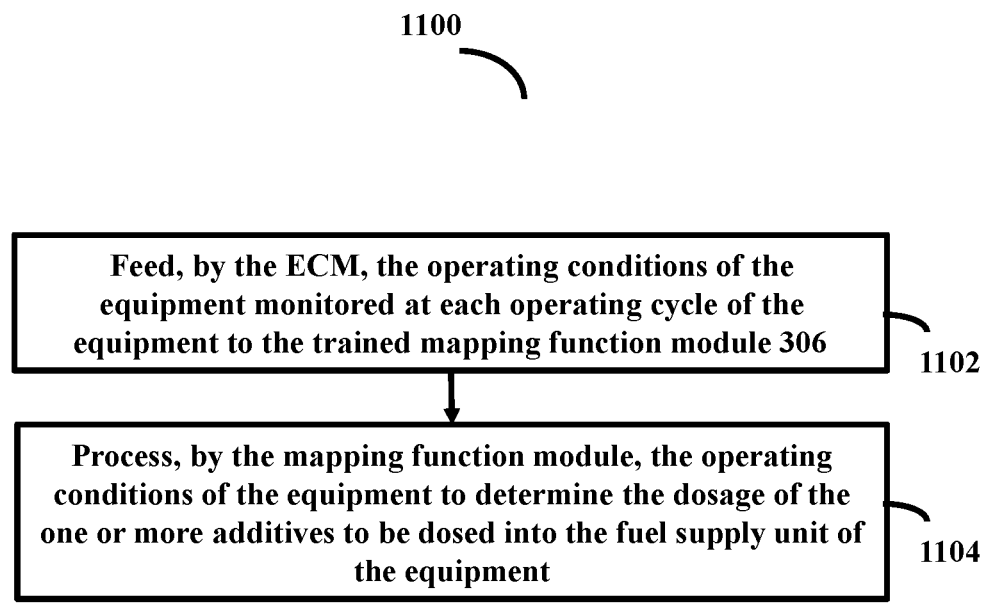
FIG. 11 is a flow diagram depicting a method for determining the dosage of the one or more additives using the mapping function module, according to embodiments as disclosed herein.

FIG. 11 is a flow diagram 1100 depicting a method for determining the dosage of the one or more additives using the mapping function module 304, according to embodiments as disclosed herein.

At step 1102, the method includes feeding, by the ECM 110, the operating conditions of the equipment 102 monitored at each operating cycle of the equipment 102 to the dispensing mapping function module 304.

At step 1104, the method includes processing, by the mapping function module 304, the operating conditions of the equipment 102 to determine the dosage of the one or more additives to be dosed into the fuel supply unit 106 of the equipment. In an example, the ECM 110 or the external entity 104 may train the mapping function module 304 using the offline RL method. In another example, the ECM 110 or the external entity 104 may train the mapping function module 304 using the supervised learning method. In yet another example, the ECM 110 or the external entity 104 may train the mapping function module 304 using the online RL method. The various actions in method 1100 may be performed in the order presented, in a different order or simultaneously. Further, in some embodiments, some actions listed in FIG. 11 may be omitted.

Figure 12:
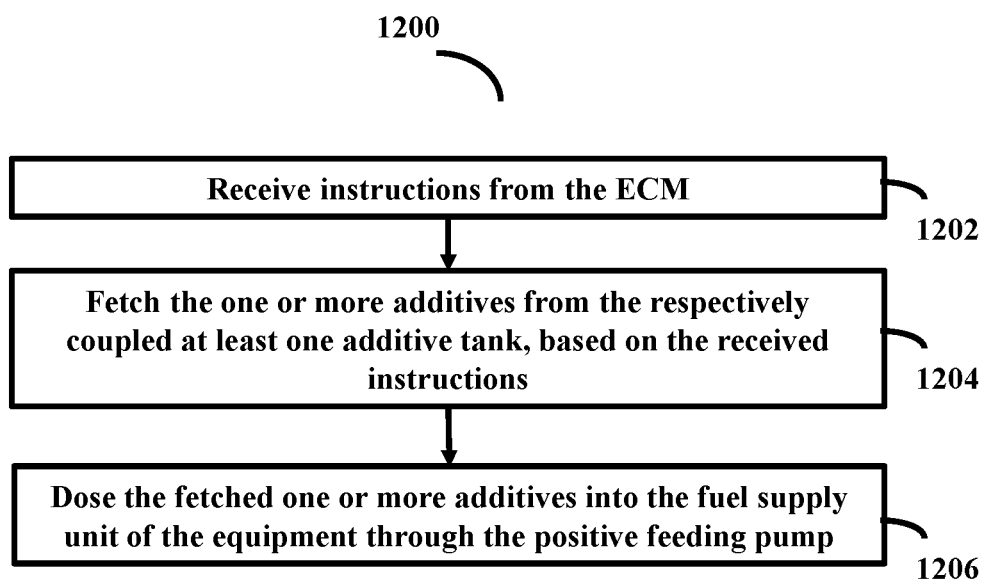
FIG. 12 is a flow diagram depicting a method for dosing the one or more additives into the fuel supply unit of the equipment, according to embodiments as disclosed herein.

FIG. 12 is a flow diagram 1200 depicting a method for dosing the one or more additives into the fuel supply unit 106 of the equipment 102, according to embodiments as disclosed herein.

At step 1202, the method includes receiving, by the at least one additive dosing unit (112a-112n/112) of the additive dispensing device 108, the instructions from the ECM 110. The instructions indicate dosage of the one or more additives determined to be dosed into the fuel supply unit 106 of the equipment 102, based on the real-time operating conditions of the equipment 102.

At step 1204, the method includes fetching, by the at least one additive dosing unit (112a-112n/112), the one or more additives from the respectively coupled at least one additive tank (114a-114n/114), based on the received instructions.

At step 1206, the method includes dosing, by the at least one additive dosing unit (112a-112n/112), the fetched one or more additives into the fuel supply unit 106 of the equipment 102 through the positive feeding pump. The at least one additive dosing unit (112a-112n/112) may dose the one or more additives into the at least one site of the fuel supply unit 106, which has been defined at the installation time of the fuel supply unit 106 in the equipment 102. In an example herein, the at least one site for dosing the one or more additives into the fuel supply unit is at various stages before burning of the at least one fuel in the fuel supply unit. The various actions in method 1200 may be performed in the order presented, in a different order or simultaneously. Further, in some embodiments, some actions listed in FIG. 12 may be omitted.

Embodiments herein determine dosage of one or more additives to be dosed into a fuel supply unit of an equipment, based on real-time operating conditions of the equipment.

Embodiments herein suggest a change in quantity of the one or more additives for dosing the one or more additives at each operating cycle of the equipment 102, thereby optimizing equipment performance.

Embodiments herein enable dosing of the one or more additives into at least one site of the fuel supply unit, wherein the at least one site for dosing the at one or more additives into the fuel supply unit is at various stages before burning of at least one fuel in the fuel supply unit.

Embodiments herein diagnose malfunctions of the equipment and recommend the dosing of the one or more additives to solve the diagnosed malfunctions of the equipment.

Embodiments herein recommend dosing of the one or more additives into the fuel supply unit at real-time as and when required.

Embodiments herein solve adverse effects and problem of rusting of fuel tanks or damaging gaskets and other fittings of the equipment, or the like (due to adding of the one or more additives to a fuel at a source), by analyzing physical properties of the additives such as, but are not limited to, forming forms, rusting on storage, homogenization, compatibility, reactivity, and so on. In an embodiment, the one or more additives may not be mixed in the fuel supply unit at a source since the additives have been stored in the separate additive tank and dosed into the fuel supply unit at the real-time.

The embodiments disclosed herein may be implemented through at least one software program running on at least one hardware device and performing network management functions to control the elements. The elements shown in FIGS. 1a-6, may be at least one of a hardware device, or a combination of hardware device and software module.

The embodiments disclosed herein describe methods and systems for real-time dosing of additives into a fuel supply unit. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein may be practiced with modification within the spirit and scope of the embodiments as described herein.

What is claimed is:

1. A method for real-time dosing of at least one additive into a fuel supply unit of an equipment, the method comprising:
    capturing, by an Electronic Control Module (ECM), at least one operating condition of the equipment;
    determining, by the ECM, dosage of the at least one additive to be dosed into the fuel supply unit of the equipment, based on the captured at least one operating condition of the equipment, wherein determining, by the ECM, the dosage of the at least one additive includes:
    processing the at least one operating condition of the equipment using a mapping function module to determine the dosage of the at least one additive;
    creating a training dataset using the at least one operation condition of the equipment and the corresponding at least one of the dosage of the at least one additive and fuel consumption, an emission profile, and an efficiency profile of the equipment;
    communicating the created training dataset to an external entity; and
    updating the mapping function module using the created training dataset; and
    enabling, by the ECM, an additive dispensing device to dose the determined dosage of the at least one additive into the fuel supply unit of the equipment.

2. The method of claim 1, wherein
    the at least one operating condition of the equipment at a current operating cycle is captured using at least one sensor;
    the at least one operating condition of the equipment includes at least one of, type of the equipment, type of at least one fuel on which the equipment operates, climate conditions, stationary operating parameters of the equipment, usage related parameters, and burner based parameters.

3. The method of claim 1, wherein the determined dosage of the at least one additive includes the at least one additive to be dosed, and quantity of the at least one additive to be dosed into the fuel supply unit of the equipment, at the current operating cycle of the equipment.

4. The method of claim 1, wherein
    the mapping function module is received by the ECM from an external entity, wherein the external entity trains the mapping function module to determine the dosage of the at least one additive for the at least one operating condition of the equipment; or
    the mapping function is trained by the ECM to determine the dosage of the at least one additive for the at least one operating condition of the equipment, wherein the mapping function module is a trained neural network.

5. The method of claim 4, wherein training the mapping function module includes:
    collecting training dataset including states, actions, and feedback, wherein the states correspond to operating conditions of the equipment monitored during previous operations of the equipment, the actions correspond to at least one of the dosage of the at least one additive dosed into the fuel supply unit and fuel consumption of the equipment with respect to the monitored operating conditions of the equipment during the previous operations, and the feedback corresponds to an emission profile and an efficiency profile of the equipment with respect to the monitored operating conditions and the dosage of the at least one additive during the previous operations; and
    applying an offline Reinforcement Learning (RL) method on the collected training dataset to train the mapping function to determine the dosage of the at least one additive for the at least one operating condition of the equipment.

6. The method of claim 4, wherein training the mapping function module includes:
    collecting compressed training dataset including the states and the actions; and
    applying a supervised learning method on the collected compressed training dataset to train the mapping function to determine the dosage of the at least one additive for the at least one operating condition of the equipment.

7. The method of claim 4, wherein training the mapping function module includes:
    collecting the operating conditions of the equipment monitored during the previous operations of the equipment, as the states;
    applying an online RL method on the collected operating conditions of the equipment to determine the dosage of the at least one additive for the collected operating conditions of the equipment, as the actions for the states;
    providing the determined dosage of the at least one additive to a simulator module, wherein the simulator module feedbacks the emission profile and the efficiency profile of the equipment for the provided at least one of the dosage of the at least one additive and the fuel consumption; and
    using the online RL method to train the mapping function module by updating parameters of the mapping function based on the emission profile, the efficiency profile of the equipment, and at least one of the additive dosage and the fuel consumption of the equipment.

8. The method of claim 1, wherein the additive dispensing device includes at least one additive dosing unit coupled with at least one additive tank.

9. The method of claim 8, wherein
    the at least one additive tank stores at least one additive; and
    the at least one additive dosing unit comprises a positive feeding pump with a dosing nozzle.

10. The method of claim 9, further comprising:
    fetching, by the additive dosing unit, the at least one additive from the at least one additive tank, based on the determined dosage of the at least one additive; and
    dosing, by the additive dosing unit, the fetched at least one additive into at least one site in the fuel supply unit of the equipment through the positive feeding pump, based on the determined dosage of the at least one additive.

11. The method of claim 10, wherein
    the at least one site indicates a point of dosing the at least one additive into the fuel supply unit;

the at least one site corresponds to at least one component of the fuel supply unit where the at least one fuel does not burn; and the at least one site is defined at time of installation of the fuel supply unit in the equipment, wherein the at least one site is fixed, wherein the at least one site is varied based on results of operations of the equipment.

12. The method of claim 1, further comprising:
recording, by the ECM, the emission profile, and the efficiency profile of the equipment with respect to the at least one operating condition of the equipment and corresponding at least one of the dosage of the at least one additive dosed into the fuel supply unit and the fuel consumption.

13. The method of claim 1, further comprising: detecting, by the ECM, at least one fault associated with the equipment, wherein detecting the at least one fault includes:
collecting at least one parameter and a corresponding value of the equipment, at the current operating cycle of the equipment;
comparing the collected at least one parameter and the corresponding value with pre-defined at least one parameter and a corresponding value; and
detecting the at least one fault associated with the equipment, if the collected at least one parameter and the corresponding value deviates from the pre-defined corresponding value of the at least one respective parameter.

14. The method of claim 13, further comprising:
recommending, by the ECM, the at least one additive to resolve the detected at least one fault associated with the equipment.

15. An equipment comprising:
a fuel supply unit;
an additive dispensing device coupled with the fuel supply unit; and
an Electronic Control Module (ECM) coupled with the fuel supply unit and the additive dispensing device configured to:
capture at least one operating condition of the equipment;
determine dosage of at least one additive to be dosed into the fuel supply unit of the equipment, based on the captured at least one operating condition of the equipment, wherein the ECM is configured to:
process the at least one operating condition of the equipment using a mapping function module to determine the dosage of the at least one additive;
create a training dataset using the at least one operation condition of the equipment and the corresponding at least one of the dosage of the at least one additive and fuel consumption, an emission profile, and an efficiency profile of the equipment;
communicate the created training dataset to an external entity; and
update the mapping function module using the created training dataset; and
enable the additive dispensing device to dose the determined dosage of the at least one additive into the fuel supply unit of the equipment.

16. The equipment of claim 15, wherein
the at least one operating condition of the equipment at a current operating cycle is captured using at least one sensor;
the at least one operating condition of the equipment includes at least one of, type of the equipment, type of at least one fuel on which the equipment operates, climate conditions, stationary operating parameters of the equipment, usage related parameters, and burner based parameters.

17. The equipment of claim 15, wherein the determined dosage of the at least one additive includes the at least one additive to be dosed, and quantity of the at least one additive to be dosed into the fuel supply unit of the equipment, at a current operating cycle of the equipment.

18. The equipment of claim 15, wherein
the mapping function module is received by the ECM from an external entity, wherein the external entity trains the mapping function module to determine the dosage of the at least one additive for the at least one operating condition of the equipment; or
the mapping function is trained by the ECM to determine the dosage of the at least one additive for the at least one operating condition of the equipment, wherein the mapping function module is a trained neural network.

19. The equipment of claim 18, wherein the ECM is configured to:
collecting training dataset including states, actions, and feedback, wherein the states correspond to operating conditions of the equipment monitored during previous operations of the equipment, the actions correspond to at least one of the dosage of the at least one additive dosed into the fuel supply unit and fuel consumption of the equipment with respect to the monitored operating conditions of the equipment during the previous operations, and the feedback corresponds to an emission profile and an efficiency profile of the equipment with respect to the monitored operating conditions and the dosage of the at least one additive during the previous operations; and
applying an offline Reinforcement Learning (RL) method on the collected training dataset to train the mapping function to determine the dosage of the at least one additive for the at least one operating condition of the equipment.

20. The equipment of claim 18, wherein the ECM is configured to:
collect compressed training dataset including the states and the actions; and
apply a supervised learning method on the collected compressed training dataset to train the mapping function to determine the dosage of the at least one additive for the at least one operating condition of the equipment.

21. The equipment of claim 18, wherein the ECM is configured to:
collect the operating conditions of the equipment monitored during the previous operations of the equipment, as the states;
apply an online RL method on the collected operating conditions of the equipment to determine the dosage of the at least one additive for the collected operating conditions of the equipment, as the actions for the states;
provide the determined dosage of the at least one additive to a simulator module, wherein the simulator module feedbacks the emission profile and the efficiency profile of the equipment for the provided at least one of the dosage of the at least one additive and the fuel consumption; and
use the online RL method to train the mapping function module by updating parameters of the mapping function based on the emission profile, the efficiency profile of the equipment, and at least one of the additive dosage and the fuel consumption of the equipment.

22. The equipment of claim 15, wherein the additive dispensing device includes at least one additive dosing unit coupled with at least one additive tank.

23. The equipment of claim 22, wherein
the at least one additive tank stores at least one additive; and
the at least one additive dosing unit comprises a positive feeding pump with a dosing nozzle, wherein the at least one additive dosing unit is configured to:
fetch the at least one additive from the at least one additive tank, based on the determined dosage of the at least one additive; and
dose the fetched at least one additive into at least one site of the fuel supply unit of the equipment through the positive feeding pump, based on the determined dosage of the at least one additive.

24. The equipment of claim 23, wherein
the at least one site indicates a point of dosing the at least one additive into the fuel supply unit;
the at least one site corresponds to at least one component of the fuel supply unit where the at least one fuel does not burn; and
the at least one site is defined at time of installation of the fuel supply unit in the equipment, wherein the at least one site is fixed, wherein the at least one site is varied based on results of operations of the equipment.

25. The equipment of claim 15, wherein the ECM is further configured to:
record the emission profile and the efficiency profile of the equipment with respect to the at least one operating condition of the equipment and corresponding at least one of the dosage of the at least one additive dosed into the fuel supply unit and the fuel consumption of the equipment.

26. The equipment of claim 15, wherein the ECM is further configured to detect at least one fault associated with the equipment by:
collecting at least one parameter and a corresponding value of the equipment, at the current operating cycle of the equipment;
comparing the collected at least one parameter and the corresponding value with pre-defined at least one parameter and a corresponding value; and
detecting the at least one fault associated with the equipment, if the collected at least one parameter and the corresponding value deviates from the pre-defined corresponding value of the at least one respective parameter.

27. The equipment of claim 26, wherein the ECM is further configured to:
recommend the at least one additive to resolve the detected at least one fault associated with the equipment.

28. An Electronic Control Module (ECM) of an equipment comprising:
a memory; and
a processor coupled to the memory configured to:
capture at least one operating condition of the equipment;
process the captured at least one operating condition of the equipment to determine dosage of at least one additive to be dosed into a fuel supply unit of the equipment, wherein the dosage includes at least one of, the at least one additive, and quantity of the at least one additive for dosing into the fuel supply unit, wherein the processor is configured to process the at least one operating condition of the equipment using a mapping function module; and
enable an additive dispensing device of the equipment to dose the determined dosage of the at least one additive into the fuel supply unit of the equipment.

29. The ECM of claim 28, wherein the processor is configured to:
apply an offline Reinforcement Learning (RL) method on a training dataset including states, actions, and feedback to train the mapping function module; or
apply a supervised learning method on a compressed training dataset including the states and the actions to train the mapping function module; or
using an online RL method and a simulator module to train the mapping function module based on the training dataset including the states, the actions, and the feedback.

30. The ECM of claim 28, wherein the processor is further configured to:
record an emission profile and a fuel consumption of the equipment with respect to the at least one operating condition of the equipment and the corresponding dosage of the at least one additive dosed into the fuel supply unit;
create the training dataset using the at least one operation condition of the equipment and the corresponding dosage of the at least one additive, the emission profile, and the fuel consumption of the equipment;
communicate the created training dataset to an external entity; and
update the mapping function module using the created training dataset.

31. An additive dosing device of an equipment comprising:
at least one additive tank to store at least one additive; and
at least one additive dosing unit coupled to the at least one additive tank, wherein the at least one additive dosing unit comprises a positive feeding pump with a dosing nozzle, wherein the at least one additive dosing unit is configured to:
receive instructions from an Electronic Control Module (ECM) of the equipment, wherein the instructions indicate dosage of the at least one additive determined to be dosed into a fuel supply unit of the equipment, based on real-time operating conditions of the equipment, wherein ECM is configured to process the at least one operating condition of the equipment using a mapping function module;
fetch the at least one additive from the at least one additive tank, based on the received instructions; and
dose the fetched at least one additive into at least one site of the fuel supply unit of the equipment through the positive feeding pump, wherein the at least one site corresponds to at least one component of the at least one equipment where at least one fuel does not burn.

32. An external entity in a dosing system comprising of an equipment, wherein the external entity is configured to:
receive training dataset from an Electronic Control Module (ECM) of the equipment;
train a mapping function module based on the received training dataset; and
configure the trained mapping function module on the ECM to determine dosage of at least one additive to be dosed into a fuel supply unit of the equipment, for real-time operating conditions of the equipment.

33. The external entity of claim 32, wherein the external entity is further configured to:
- apply an offline Reinforcement Learning (RL) method on the training dataset including states, actions, and feedback to train the mapping function module; or
- apply a supervised learning method on the training dataset including the states and the actions to train the mapping function module; or
- using an online RL method to train the mapping function module based on an interaction with a simulator module related to the states, the actions and the feedback, wherein the states correspond to operating conditions of the equipment monitored during previous operations of the equipment, the actions correspond to at least one of the dosage of the at least one additive dosed into the fuel supply unit and fuel consumption of the equipment with respect to the monitored operating conditions of the equipment during the previous operations, and the feedback corresponds to an emission profile and, an efficiency profile of the equipment with respect to the monitored operating conditions and the corresponding at least one of the dosage of the at least one additive and the fuel consumption during the previous operations.

* * * * *